US009969939B2

(12) United States Patent
Reinikainen et al.

(10) Patent No.: US 9,969,939 B2
(45) Date of Patent: May 15, 2018

(54) METHOD AND APPARATUS FOR PRODUCING A HYDROCARBON FRACTION AND A HYDROCARBON FRACTION AND ITS USE

(71) Applicant: Teknologian tutkimuskeskus VTT Oy, Espoo (FI)

(72) Inventors: Matti Reinikainen, Espoo (FI); Pekka Simell, Espoo (FI)

(73) Assignee: Teknologian tutkimuskeskus VTT Oy, Espoo (FI)

(*) Notice: Subject to any disclaimer, the term of this patent is extended or adjusted under 35 U.S.C. 154(b) by 0 days. days.

(21) Appl. No.: 15/027,940

(22) PCT Filed: Oct. 9, 2014

(86) PCT No.: PCT/FI2014/050766
§ 371 (c)(1),
(2) Date: Apr. 7, 2016

(87) PCT Pub. No.: WO2015/052379
PCT Pub. Date: Apr. 16, 2015

(65) Prior Publication Data
US 2016/0237354 A1    Aug. 18, 2016

(30) Foreign Application Priority Data
Oct. 10, 2013   (FI) .................................... 20136010

(51) Int. Cl.
*C10G 2/00* (2006.01)
*B01J 35/00* (2006.01)
(Continued)

(52) U.S. Cl.
CPC ............ *C10G 2/332* (2013.01); *B01J 23/745* (2013.01); *B01J 23/75* (2013.01); *B01J 35/0006* (2013.01);
(Continued)

(58) Field of Classification Search
CPC .......... C10G 2/332; C10G 2/341; C10G 7/00; C10L 1/06; B01J 23/745; B01J 23/75; B01J 35/0006
See application file for complete search history.

(56) References Cited

U.S. PATENT DOCUMENTS 6,331,573 B1 * 12/2001 Kibby .................... C10G 2/332
518/700
2002/0151605 A1   10/2002 Kibby
(Continued)

FOREIGN PATENT DOCUMENTS

| KR | 2010 0006211 A | 1/2010 |
| WO | WO 2001/064607 A2 | 9/2001 |
| WO | WO 2002/087743 A1 | 11/2002 |

OTHER PUBLICATIONS

Wikipedia: Syngas [retrieved Jan. 7th 2015] <http://en.wikipedia.org/wiki/Syngas>, 5 pages.
(Continued)

*Primary Examiner* — Brian A McCaig
(74) *Attorney, Agent, or Firm* — Alston & Bird LLP

(57) ABSTRACT

Provided is a method and apparatus for producing a hydrocarbon fraction. The hydrocarbon fraction is formed from biomass based synthesis gas, the synthesis gas is fed through at least two catalyst layer, the first catalyst layer includes Fe-based catalyst, the second catalyst layer includes Co-based catalyst, and the synthesis gas is treated by supplying the synthesis gas through the first and second catalyst layers in order to form a hydrocarbon composition including the hydrocarbon fraction. Further, provided is a hydrocarbon fraction and its use.

9 Claims, 1 Drawing Sheet

(51) Int. Cl.
  *B01J 23/745* (2006.01)
  *B01J 23/75* (2006.01)
  *C10G 7/00* (2006.01)
  *C10L 1/06* (2006.01)
  *C10G 1/06* (2006.01)

(52) U.S. Cl.
  CPC ............... *C10G 2/341* (2013.01); *C10G 7/00* (2013.01); *C10L 1/06* (2013.01); *C10G 2300/1011* (2013.01); *C10G 2400/02* (2013.01); *C10L 2200/0423* (2013.01); *C10L 2200/0492* (2013.01); *C10L 2270/023* (2013.01); *C10L 2290/42* (2013.01); *C10L 2290/543* (2013.01); *Y02P 30/20* (2015.11)

(56) References Cited

U.S. PATENT DOCUMENTS

| | | | |
|---|---|---|---|
| 2002/0187094 A1* | 12/2002 | Motal | B01J 8/008 423/244.01 |
| 2005/0113465 A1 | 5/2005 | O'Rear et al. | |
| 2012/0275975 A1 | 11/2012 | Lee et al. | |

OTHER PUBLICATIONS

International Search Report and Written Opinion for International Application No. PCT/FI2014/050766, dated Jan. 12, 2015, 9 pages.

* cited by examiner

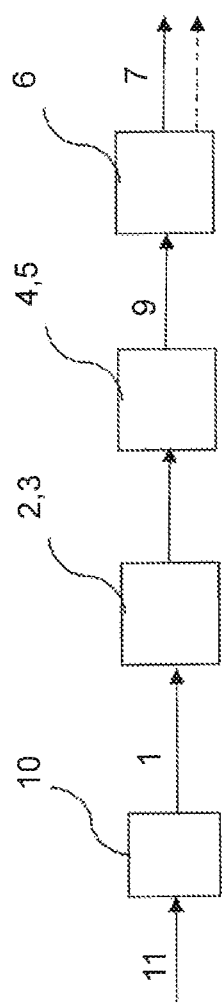

METHOD AND APPARATUS FOR PRODUCING A HYDROCARBON FRACTION AND A HYDROCARBON FRACTION AND ITS USE

This application is a national phase entry of PCT/F 12014/050766, filed on Oct. 9, 2014, which claims the benefit of priority of FI application No. 20136010, filed Oct. 10, 2013, the contents of which are hereby incorporated by reference in its entirety for all purposes.

FIELD

The invention relates to a method defined in the preamble of claim 1 and an apparatus defined in the preamble of claim 11 for producing a hydrocarbon fraction. Further, the invention relates to a hydrocarbon fraction defined in the preamble of claim 21 and its use defined in the preamble of claim 24

BACKGROUND

It is known from the prior art that carbonaceous feedstocks can be converted to synthesis gas by gasification and gas cleaning processes. The desired components of synthesis gas, hydrogen and carbon monoxide, can be used in chemical industry to produce a wide range of products such as liquid hydrocarbon fuels, alcohols, synthetic natural gas and fertilizers. One of the most important conversion processes is the Fischer-Tropsch (F-T) synthesis. In the basic form of the F-T synthesis the synthesis gas is converted to straight chain hydrocarbons in the presence of catalysts at temperature of 200-250° C. and pressure of 20-40 bar. The catalytically active metals, such as Fe, Co, Ru, Ni and Rh, can be used as catalyst. Mainly iron and cobalt catalysts are used commercially, and cobalt is dominating the market.

High-temperature Fischer-Tropsch is operated typically at temperatures of 330-350° C., and it uses an iron-based catalyst. Low-temperature Fischer-Tropsch is operated at lower temperatures which are typically 200-240° C., and it uses a cobalt-based catalyst.

Originally the raw material for the synthesis was brown coal but later natural gas (Gas-To-Liquid, GTL), coal (Coal-To-Liquid, CTL) and increasingly biomass (Biomass-to-Liquids, BTL) have been used. In principle, synthesis gas reactions are not dependant on the raw material. Technically and economically the biggest difference is the scale of the plants. BTL plants are principally at least one order of magnitude smaller than coal or natural gas plants. Gasification and gas cleaning constitute a decisive part of the investment cost, and technical solutions developed for the CTL- and GTL plants may not be suitable for BTL plants.

Many impurities are always present in the synthesis gas stream, and efficient gas purification is necessary before the synthesis gas can be used in typical applications. The requirements for gas purity in the F-T synthesis are very stringent because both Co-catalyst and Fe-catalyst are easily poisoned by the impurities. In this respect all typical contaminants, such as mechanical particles, acidic and basic agents, alkali metals and tars are problematic, and only very low concentrations can be tolerated. However, it has been reported that iron catalysts are more tolerant to sulphur than cobalt catalysts.

There are commercial absorption processes available for the removal of harmful contaminants. However, these processes are typically complex, and the very high investment cost may be an obstacle for their use in the small scale of typical BTL plants. As a whole, gas cleanup is the most critical problem in the development of advanced gasification based processes for most applications.

A separate zinc oxide guard bed is usually used to reduce the total sulfur content of the synthesis gas to less than 10 ppbv. The sulphur removal can be enhanced with another bed of nickel material. This ultra-low level of sulphur in the synthesis gas is useful for the applications of hydrocarbon synthesis.

Final cleanup of biomass gasification gas to the purity level required in cobalt catalyst beds is very expensive necessitating very large production units to be economic.

In the F-T synthesis diesel and other middle-distillates may be produced using a two-step process. In the first stage synthesis gas is converted to long-chain hydrocarbon wax. In the second step these heavy paraffins are selectively converted into desired middle distillates, kerosene and gas oil. The second step is a mild hydrocracking process using a dual-functional catalyst. New GTL-, CTL- and BTL-projects are almost exclusively based on a corresponding technology. The obvious drawbacks of this kind of concept are complexity of the process leading to a higher investment cost as well as need of hydrogen in the cracking step.

Typical challenges of the BTL-plant can be listed as follows: biomass cost and logistics, cost of processes, gasification and gas cleaning in small scale, processing and upgrading of products and waste-water treatment in a stand-alone plant. Therefore there is no commercial scale BTL-plants in operation. The high investment cost compared with the fairly low capacity has been an obstacle for commercial projects. Technical solutions suitable for much larger plants seem to prove too expensive for the scale of the BTL-plant.

The choice of the catalysts as well as the reaction conditions has a significant effect on the product distribution of the process. Low temperature, high pressure and the use of cobalt catalyst generally produce a heavy, highly n-paraffinic hydrocarbon product and has thus been the preferred choice for most of the F-T-projects.

The objective of the invention is to disclose a new type method and apparatus for producing a hydrocarbon fraction. Further, the objective of the invention is to produce a new hydrocarbon product.

SUMMARY

The method and apparatus and hydrocarbon fraction according to the invention is characterized by what has been presented in the claims.

The invention is based on a method for producing a hydrocarbon fraction. According to the invention, a hydrocarbon fraction is formed from biomass based synthesis gas, the synthesis gas is fed through at least two catalyst layer, the first catalyst layer includes Fe-based catalyst, the second catalyst layer includes Co-based catalyst, and the synthesis gas is treated by supplying the synthesis gas through the first and second catalyst layers in order to form a hydrocarbon composition including the hydrocarbon fraction, and reaction pressure is between 3 to 10 bar in the first catalyst layer and reaction pressure is between 3 to 10 bar in the second catalyst layer.

Further, the invention is based on an apparatus for producing a hydrocarbon fraction. According to the invention, the apparatus for forming a hydrocarbon fraction comprises a feeding device for feeding biomass based synthesis gas into the apparatus, at least one reactor which comprises at least one catalyst layer and in which the synthesis gas is treated, and at least two catalyst layers through which the synthesis gas is fed, and the first catalyst layer includes Fe-based catalyst and the second catalyst layer includes Co-based catalyst, in order to form a hydrocarbon composition including the hydrocarbon fraction, and the apparatus comprises a pressure controlling device to control the pressure in the first catalyst layer (3) and in the second catalyst layer (5) so that reaction pressure is between 3 to 10 bar in the first and second catalyst layers.

Further, the invention is based on a hydrocarbon fraction. According to the invention, the hydrocarbon fraction has been formed from biomass based synthesis gas so that the synthesis gas has been treated in at least two catalyst layer in which the first catalyst layer includes Fe-based catalyst and the second catalyst layer includes Co-based catalyst in order to form a hydrocarbon composition including the hydrocarbon fraction and the hydrocarbon fraction has been separated from the hydrocarbon composition.

In this context, the biomass based synthesis gas refers to any biomass based gaseous material formed by a suitable synthesis method. The biomass based synthesis gas may be formed from any biomass material or any combination of different biomass materials. The biomass material may contain also other materials than biomass but the biomass material contains at least 60% by weight biomass. The biomass based synthesis gas is formed by treating biomass material by means of a suitable synthesis and by producing a synthesis gas from biomass material. In one embodiment the synthesis gas is formed in a biomass gasification.

In this context, the catalyst layer means any catalyst layer, catalyst bed or the like.

It is important for the present invention that a combination of Fe-based catalyst layer and Co-based catalyst layer is used. Preferably, olefinic hydrocarbons are produced by means of the Fe-based catalyst, and hydrocarbons can be modified and yield can be improved by means of the Co-based catalyst. When the synthesis gas is formed from biomass so then $H_2$:CO molar ratio of the synthesis gas is low, typically about 1:1. Therefore $H_2$:CO molar ratio shall be increased before the Co-based catalyst layer. By means of the Fe-based catalyst layer $H_2$:CO molar ratio can be increased to the level, preferably between 1.5:1-2.5:1, more preferable 2:1, which is suitable for the Co-based catalyst.

In one embodiment, the first catalyst layer and the second catalyst layer have been arranged sequentially, preferably in series, so that the synthesis gas is first fed through the first catalyst layer and then through the second catalyst layer.

In one embodiment, the apparatus comprises at least two reactors in which the first reactor comprises the first catalyst layer and the second reactor comprises the second catalyst layer. In one embodiment the apparatus comprises two first reactors which may be used by turns or in parallel. In the separate reactors the catalyst can be changed or regenerated easily and independently.

In one embodiment, the apparatus comprises a reactor including the first catalyst layer and the second catalyst layer. The first catalyst layer and the second catalyst layer have been arranged sequentially in the reactor so that the synthesis gas flows first through the first catalyst layer and then through the second catalyst layer.

Any suitable reactor known per se can be used in the catalysis reaction. Preferably, the reactor can be a fixed bed reactor, a slurry reactor, an other suitable reactor or the like. In one embodiment the reactor is a fixed bed reactor. In one embodiment the reactor is a slurry reactor. The first reactor and the second reactor may be similar reactors or alternatively different reactors. Preferably each reactor is a continuous reactor. In one embodiment a Fischer-Tropsch type apparatus can be utilized in the method of the invention.

Preferably, reaction pressure is between 3 to 30 bar. In one embodiment, reaction pressure is between 3 to 10 bar, preferably between 4 to 8 bar, more preferable between 4 to 6 bar, during the reaction in the reactor, and preferably in the both catalyst layers. It is important that low pressure is used in the process and the reactors of the present invention. Thanks to the process of the present invention, there is no need to increase pressure after the biomass gasification or before the first reaction step of the invention, and same pressure level can be used in the catalyst reactions than in the biomass gasification. Further, by means of the present invention low pressure can be used also in Co-based catalyst layer in order to produce desired hydrocarbons. When lower pressure is used in the reaction then sulphur absorbs more weakly to the Co-based catalyst. Further, lower pressure facilitates equipment engineering and decreases process costs.

In one embodiment the apparatus comprises a gasification device of the biomass material. Because pressure is typically below 5 bar in the biomass gasification so same pressure area can be used in the catalyst reactions when biomass based synthesis gas from the gasification is used in the present invention.

In one embodiment the apparatus comprises a first pressure controlling device to control the pressure in the first catalyst layer. In one embodiment the apparatus comprises a second pressure controlling device to control the pressure in the second catalyst layer. In one embodiment the first pressure controlling device is arranged in connection with the reactor, preferably in connection with the first reactor. In one embodiment the second pressure controlling device is arranged in connection with the reactor, preferably in connection with the second reactor.

In one embodiment, the temperature in the first catalyst layer is between 220-350° C., preferably 270-320° C. In one embodiment, the temperature in the second catalyst layer is between 180-250° C., preferably 200-240° C.

It is important that low temperature can be used in the reactors and in the process. Preferably, temperature may be controlled during the catalysis reactions. In one embodiment, the temperatures are independently controllable in the both catalyst layers. In one embodiment, the temperature is controlled separately in the both catalyst layers. Preferably, the temperatures in the both catalyst layers can be adjusted independently, and both of the catalyst layers can be regenerated independently.

Preferably, temperatures are selected so that sufficient reaction rate and desired product fraction can be achieved. In low pressure the activity is lower and then higher temperature is used. In the higher temperature lighter product can be produced and in the lower temperature heavier product can be produced. When the temperatures of the first and second catalyst layers can be adjusted independently so then product composition can be controlled.

In one embodiment the apparatus comprises a first temperature controlling device to control the temperature in the first catalyst layer. In one embodiment the apparatus comprises a second temperature controlling device to control the temperature in the second catalyst layer. In one embodiment the first temperature controlling device is arranged in connection with the reactor, preferably in connection with the first reactor. In one embodiment the second temperature controlling device is arranged in connection with the reactor, preferably in connection with the second reactor.

In one embodiment, the hydrocarbon fraction is separated from the hydrocarbon composition. In one embodiment, the hydrocarbon fraction is separated by distillation from the hydrocarbon composition. In one embodiemnt, the apparatus comprises a separation device, e.g. a distillation device. In one embodiment at least one other fraction is separated. The other fraction may be another hydrocarbon fraction or oxygen containing fraction. In one embodiment the other fraction is separated by the same separation device than the hydrocarbon fraction of the invention. Alternatively, the other fraction is separated by a separate separation device. In one embodiment the apparatus comprises a water removal device.

In one embodiment, the hydrocarbon fraction is a gasoline fraction. In this context, gasoline means any gasoline, petrol or their component or light distillate in the distillation area of 30-200° C. or their combination. Preferably, the gasoline fraction includes paraffine hydrocarbons, olefinic hydrocarbons and aromatic hydrocarbons. In one embodiment the distillation area of the hydrocarbon fraction is 30-200° C. The gasoline fraction may contain also other agents, compounds, hydrocarbons, distillates or components. In one embodiment, the hydrocarbon fraction may contain also middle distillates with the distillation area of 180-350° C. In one embodiment, the hydrocarbon fraction contains 70-100% by weight hydrocarbons which are from the distillation area of 30-200° C.

In one embodiment, the hydrocarbon fraction includes over 50% by weight, preferably over 60% by weight and more preferable over 70% by weight, $C_5$-$C_{12}$ hydrocarbons. Further, the hydrocarbon fraction may include dry gas, such as $C_1$-$C_2$ hydrocarbons, and liquid petroleum gas, such as $C_3$-$C_4$ hydrocarbons, and oxygen containing hydrocarbons. The hydrocarbon fraction may contain also other agents, compounds, hydrocarbons, distillates or components. Preferably, the hydrocarbon fraction is in the liquid form.

In the reactions in the catalyst layers olefinic hydrocarbons are produced by means of the Fe-based catalyst. In one embodiment an amount of olefinic hydrocarbons is over 60% by weight from $C_5$-$C_{12}$ hydrocarbons after the Fe-based catalyst layer. Further, the Fe-based catalyst increases $H_2$/CO molar ratio, and it acts as a guard bed for sulphur. Hydrocarbons can be modified by means of the Co-based catalyst. Preferably, olefinic hydrocarbons are hydrated by the Co-based catalyst into paraffine hydrocarbons. The yield of $C_5$-$C_{12}$ hydrocarbons can be improved by the second catalyst layer.

In one embodiment sulphur may be removed from the synthesis gas in connection with the catalyst layer or catalyst layers, preferably in connection with the first catalyst layer. Preferably, iron based catalyst acts both as the first catalyst and as a guard bed for the cobalt based catalyst. In one embodiment, sulphur may be removed in an additional step, preferably before the first catalyst layer.

In one embodiment, at least one promoter is added to modify at least one catalyst.

In one embodiment, the hydrocarbon fraction is used and utilized as a fuel, preferably as a fuel component. In one embodiment, the hydrocarbon fraction is used in the manufacturing of the fuel. In one embodiment, the hydrocarbon fraction is used as the fuel or the fuel component as such or after the additional treatment. In this context, the fuel refers to any gasoline, petrol, naphta, light fuel oil or the like.

The method and apparatus according to the invention are suitable for using in Biomass-to-Liquid processes and plants.

The invention provides the advantage that the hydrocarbon product with good quality can be manufactured successfully. Thanks to the invention, reactions for forming gasoline fraction can be carried out at a low pressure and at a low temperature. By means of the invention the desired product consisting of a large extent of gasoline range ($C_5$-$C_{12}$) products can be formed. Further, by means of the invention the hydrocarbon composition can be adjusted by controlling temperatures of the first catalyst layer and/or the second catalyst layer and by modifying catalyst in the first catalyst layer and/or the second catalyst layer. In the method of the invention two catalysts are utilized so that the first catalyst is an iron catalyst and the second a cobalt catalyst. Thanks to the invention the synthesis gas with low hydrogen-carbon ratio and higher sulphur content can be fed into the process of the invention.

The method and apparatus of the invention offers a possibility to produce the hydrocarbon fraction cost-effectively and energy-effectively. There is no need for separate hydrogenation stages, catalyst guard bed, purification device or hydrocracking process. The present invention provides an industrially applicable, simple and affordable way of producing hydrocarbon fractions from biomass. The method and apparatus of the present invention is easy and simple to realize as a production process. Further, the catalyst is easy to change or regenerate.

BRIEF DESCRIPTION OF THE DRAWING(S)

In the following section, the invention will be described with the aid of detailed exemplary embodiments, referring to the accompanying FIGURE wherein FIG. 1 presents one embodiment of the apparatus according to the invention.

DETAILED DESCRIPTION

FIG. 1 presents the apparatus according to the invention for producing a hydrocarbon fraction.

EXAMPLE 1

The apparatus of FIG. 1 comprises two fixed bed reactors 2, 4 and a distillation device 6 in order to form a hydrocarbon fraction 7 from a biomass based synthesis gas 1. The first reactor 2 and the second reactor 4 are arranged in series and are joined together. The distillation device 6 is connected to the second reactor 4.

The synthesis gas 1 is fed into the first reactor 2 which comprises the first catalyst bed 3 containing Fe-based catalyst, and from the first reactor the treated synthesis gas product is fed into the second reactor 4 which comprises the second catalyst bed 5 containing Co-based catalyst in order to form a hydrocarbon composition 9. From the second reactor 4 the hydrocarbon composition 9 is fed into the distillation device 6 in which the hydrocarbon fraction 7 is separated by distillating from the hydrobarbon composition. Preferably, the hydrocarbon fraction has a distillate area of 30-200° C. and the hydrocarbon fraction contains, preferably over 60% by weight, gasoline fraction hydrocarbons.

The apparatus comprises a first temperature controlling device and a first pressure controlling device to control the temperature and pressure in the first catalyst layer 3. Further, the apparatus comprises a second temperature controlling device and a second pressure controlling device to control the temperature and pressure in the second catalyst layer 5. The first temperature controlling device and the first pressure controlling device are arranged in connection with the first reactor 2. The second temperature controlling device and the second pressure controlling device are arranged in connection with the second reactor 4. Then the temperatures and pressures can be controlled independently in the both reactors 2, 4.

Further, the apparatus may comprise a gasification and synthesis process step 10 in which biomass material 11 is gasified to form the synthesis gas 1. Alternatively, the synthesis gas 1 is fed into the first reactor of the invention from outside of the process.

Sulphur is mainly removed from the synthesis gas in the first reactor 2 in which the catalyst layer 3 acts as a guard bed. Further, by means of catalyst layer 3 $H_2$:CO molar ratio can be increased at low pressure.

The parts and devices of the apparatus used in this invention are known per se in the art, and therefore they are not described in any more detail in this context.

EXAMPLE 2

In this example a hydrocarbon fraction is formed from biomass based synthesis gas. The hydrocarbon fraction is formed by means of the apparatus according to Example 1.

The hydrocarbon fraction 7 is formed by using of combination of two catalyst layers, Fe-based catalyst layer 3 and Co-based catalyst layer 5. Typical properties of catalysts have been summarized in table 1.

TABLE 1

| Property | Catalyst | |
|---|---|---|
| | Co | Fe |
| Chain Growth Probability | High | Low |
| Activity | High | Low |
| Olefin Selectivity | Low | High |
| $H_2$/CO Ratio for Feed | >2 | 0.5 to 2.5 |
| Water-Gas-Shift Activity and $CO_2$ Selectivity | Very Low | High |
| Methane Selectivity | High | Low |
| Suitable Operation temperature | Only Low | Low to High |
| Temperature Sensitivity, Activation Energy | Very Sensitive | Slight |
| Temperature Sensitivity, Product Distribution | Sensitive | Slight |
| Pressure Sensitivity, Product Distribution | Very | Slight |
| Sulfur Tolerance | Very Little | Little to intermediate |
| Stability, Life Time | Long | Short |
| Cost | Expensive | Cheap |
| Separation from Wax | Easy | Difficult |
| Robustness | Excelllent | Poor |

In the first reaction step 2 a synthesis gas product rich in alpha olefins is formed at a low pressure, about 6 bar, by means of an iron catalyst. Temperature is about 230° C. In addition to olefins, the product contains also paraffins, small amount of other olefins and about 5-8% by weight of oxygen containing products, mainly n-alcohols, such as oxygenates. Due to the natural water-gas-shift activity of iron catalysts the hydrogen to carbon-ratio of the synthesis can be low and a separate water-gas-shift (WGS) unit is not needed. $H_2$:CO molar ratio is low, typically about 1:1, in biomass based synthesis gas. In the first reaction step 2 $H_2$:CO molar ratio is increased to the level, preferably about 2:1, which is suitable for the Co-based catalyst. In this example the resulting synthesis gas product contains 18.8% by weight dry gas, 25.0% by weight liquid petroleum gas, 27.3% by weight $C_5$-$C_{12}$ hydrocarbons and 7.5% by weight oxygenates. An amount of $C_5$-$C_{12}$ olefins is 20.0% by weight.

In the second reaction step 4 the synthesis gas product from the first reaction step 2 becomes in contact with a cobalt catalyst wherein the olefins and unreacted synthesis gas react further to hydrocarbons. Pressure is about 6 bar, and temperature is about 230° C. The resulting product is remarkably richer in paraffins and the yield of gasoline range, $C_5$-$C_{12}$, is much higher than after the first reaction step. In the hydrocarbon composition product 9 there are still oxygen containing products remaining most of which are dissolved in the water phase. In this example the resulting product contains 12.4% by weight dry gas, 17.0% by weight liquid petroleum gas, 52.3% by weight $C_5$-$C_{12}$ hydrocarbons and 7.2% by weight oxygenates. An amount of $C_5$-$C_{12}$ olefins is 4.1% by weight.

Both of the reaction steps are highly exothermic and the excess heat can be utilized in the concentration of the water phase and the separation of the oxygen containing products.

The hydrobarbon fraction 7 is separated from the hydrocarbon composition 9.

Iron catalyst layer acts both as the first catalyst and as a guard bed for the cobalt catalyst. Further, iron catalyst increases $H_2$:CO molar ratio for feed of cobalt catalyst layer. The iron catalyst layer produces olefins and other hydrocarbons from the synthesis gas with low $H_2$:CO molar ratio at a low pressure. Reaction to gasoline can be carried out at a low pressure in the cobalt catalyst layer. There is no need for a separate water-gas-shift reactor, catalyst guard bed, hydrocracking after the reactor or adjusting stage of $H_2$:CO molar ratio in the process of the present invention. The temperature control of the reactors according to the invention is not as strict as with a separate cobalt catalyst bed which is used alone in a process.

The method and apparatus according to the invention is suitable in different embodiments for forming different kinds of hydrocarbon fractions.

The invention is not limited merely to the examples referred to above; instead many variations are possible within the scope of the inventive idea defined by the claims.

The invention claimed is:

1. A method for producing a hydrocarbon fraction, wherein the hydrocarbon fraction is formed from biomass based synthesis gas, the method comprising:
   feeding the biomass based synthesis gas through at least two catalyst layers to form a hydrocarbon composition comprising the hydrocarbon fraction, wherein a first catalyst layer includes Fe-based catalyst for producing hydrocarbons and removing sulphur, and a second catalyst layer includes Co-based catalyst for modifying the hydrocarbons; and
   separating the hydrocarbon fraction from the hydrocarbon composition,
   wherein temperatures and pressures are controlled independently in both catalyst layers, and reaction pressure is between 3 to 10 bar in the first catalyst layer and reaction pressure is between 3 to 10 bar in the second catalyst layer,
   wherein the biomass based synthesis gas comprises an $H_2$:CO molar ratio of about 1.1, and feeding the biomass based synthesis gas through the first catalyst layer increases the $H_2$:CO molar ratio to about 1.5:1-2.5:1, and
   wherein the first catalyst layer is included in a first fixed bed reactor, and a temperature in the first catalyst layer is between 270 to 350° C.

2. The method according to claim 1, wherein the first catalyst layer and the second catalyst layer have been arranged sequentially so that the synthesis gas is first fed through the first catalyst layer and then through the second catalyst layer.

3. The method according to claim 1, wherein the reaction pressure is between 4 to 8 bar.

4. The method according to claim 1, wherein a temperature in the first catalyst layer is between 220 to 350° C.

5. The method according to claim 1, wherein a temperature in the second catalyst layer is between 180 to 250° C.

6. The method according to claim 1, wherein the hydrocarbon fraction is separated from the hydrocarbon composition.

7. The method according to claim 1, wherein the hydrocarbon fraction includes $C_5$-$C_{12}$ hydrocarbons.

8. The method according to claim 1, wherein the hydrocarbon fraction is a gasoline fraction.

9. The method according to claim 1, wherein at least one promoter is added to modify at least one catalyst.

* * * * *